United States Patent
Hopper et al.

(10) Patent No.: US 10,450,831 B2
(45) Date of Patent: Oct. 22, 2019

(54) CHOKE ASSEMBLY (75) Inventors: Hans Paul Hopper, Aberdeen (GB); Derek Meek, Aberdeen (GB)

(73) Assignee: Cameron International Corporation, Houston, TX (US)

( * ) Notice: Subject to any disclaimer, the term of this patent is extended or adjusted under 35 U.S.C. 154(b) by 2104 days.

(21) Appl. No.: 12/679,857

(22) PCT Filed: Sep. 24, 2008

(86) PCT No.: PCT/GB2008/003228
§ 371 (c)(1),
(2), (4) Date: Jun. 16, 2010

(87) PCT Pub. No.: WO2009/040518
PCT Pub. Date: Apr. 2, 2009

(65) Prior Publication Data
US 2010/0288389 A1 Nov. 18, 2010

(30) Foreign Application Priority Data
Sep. 26, 2007 (GB) .................................. 07253805.1

(51) Int. Cl.
*F16K 3/24* (2006.01)
*E21B 34/02* (2006.01)
(Continued)

(52) U.S. Cl.
CPC .............. *E21B 34/02* (2013.01); *E21B 43/12* (2013.01); *F16K 3/246* (2013.01); *F16K 3/32* (2013.01);
(Continued)

(58) Field of Classification Search
None
See application file for complete search history.

(56) References Cited

U.S. PATENT DOCUMENTS 3,722,854 A * 3/1973 Parola .................... F16K 47/08
137/625.28
3,813,079 A * 5/1974 Baumann et al. ............ 251/127
(Continued)

FOREIGN PATENT DOCUMENTS

DE 3615432 A1 11/1987
DE 3717128 A1 12/1988
(Continued)

OTHER PUBLICATIONS

Mokveld-Product_sheet_axial_choke.pdf [online web site] © 2007-2014 [retrieved on Nov. 16, 2014] Retrieved from the Internet <URL:http://www.mokveld.com/en/7/products-of-mokveld-/products/15/axial-choke-valve> see entire document.*
(Continued)

*Primary Examiner* — John Fox
(74) *Attorney, Agent, or Firm* — Cameron International Corporation (57) ABSTRACT

A choke assembly. In some embodiments, the choke assembly includes a choke element having a fluid flow passage therethrough. The choke element includes a cage having a plurality of apertures therethrough for the passage of fluid and a plug moveable with respect to the cage. The plug has an end surface that defines a boundary of the fluid flow passage through the choke and is moveable to open or close each of the apertures through the cage, whereby the flow of fluid through the cage is controlled. The apertures in the cage are disposed in a first portion and a second portion separated by a land. Each of the first and second portions has a least one aperture therein. The plug may be positioned with its end surface disposed to intersect the land, such that each aperture is fully open or fully closed to the flow of fluid.

17 Claims, 8 Drawing Sheets (51) Int. Cl.
*E21B 43/12* (2006.01)
*F16K 3/32* (2006.01)
*F16K 25/04* (2006.01)
*F16K 47/04* (2006.01)
*F16K 47/08* (2006.01)

(52) U.S. Cl.
CPC .............. *F16K 25/04* (2013.01); *F16K 47/04* (2013.01); *F16K 47/08* (2013.01)

(56) References Cited

U.S. PATENT DOCUMENTS

| | | | | |
|---|---|---|---|---|
| 3,908,698 A | * | 9/1975 | Baumann | F16K 1/54 137/625.3 |
| 3,921,668 A | * | 11/1975 | Self | 137/625.3 |
| 3,954,124 A | * | 5/1976 | Self | 138/42 |
| 4,327,757 A | * | 5/1982 | Weevers | 137/625.3 |
| 4,429,714 A | * | 2/1984 | Hughes et al. | 137/625.3 |
| 5,086,808 A | | 2/1992 | Pettus | |
| 5,979,558 A | | 11/1999 | Bouldin et al. | |
| 6,935,371 B2 | * | 8/2005 | Stares | 137/625.37 |
| 2002/0020534 A1 | | 2/2002 | Wilson et al. | |
| 2007/0095411 A1 | | 5/2007 | Arnison et al. | |

FOREIGN PATENT DOCUMENTS

| | | | |
|---|---|---|---|
| GB | 2124341 A | 2/1984 | |
| WO | 0102697 A1 | 1/2001 | |
| WO | 2006/070020 A1 * | 7/2006 | F16K 47/08 |

OTHER PUBLICATIONS

PCT/GB2008/003228 International Search Report and Written Opinion, dated Feb. 12, 2009.

* cited by examiner

CHOKE ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The present invention relates to a choke assembly, in particular to a choke assembly having a plug and cage type arrangement, and to the use of the choke assembly in the processing of fluid streams. The present invention further relates to a wellhead assembly comprising the choke assembly, in particular a subsea wellhead assembly. The present invention further provides a method of operating a choke assembly and for controlling the pressure of a fluid stream.

Choke assemblies are well known and widely used in an extensive range of fluid processing applications. One particular application of chokes assemblies is in the processing of fluid streams produced from subterranean oil and gas wells, in particular in installations associated with the wellhead. The principle function of a choke assembly is to control the pressure and flowrate of the fluid passing through the assembly. This is achieved, in general, by providing the choke assembly with a fluid flow passage having a variable resistance to flow or pressure drop for fluid flowing along the fluid flow passage. By changing this resistance to flow or pressure drop, the flowrate and pressure of the fluid stream may be controlled, for example to regulate a fluctuating or changing fluid pressure or to tailor the pressure of the fluid stream to meet downstream processing requirements.

One common choke assembly comprises a so-called 'plug and cage' arrangement. This assembly has a cage, typically cylindrical in form, comprising a plurality of holes or apertures therethrough for the passage of fluid. A plug, again generally cylindrical in form, is provided so as to be moveable with respect to the cage, the plug being disposed to be moveable to cover or close the apertures in the cage. The plug may be moved with respect to the cage between a closed position, in which all the apertures in the cage are covered, thus preventing fluid from flowing through the choke assembly, and a fully open position, in which all the apertures in the cage are open and available for fluid flow. Moving the plug with respect to the cage from the closed to the fully open position progressively uncovers the apertures in the cage, thus increasing the cross-sectional area available for fluid flow. In this way, the flow rate and pressure of the fluid may be varied and controlled. In the closed position, the end sealing portion of the plug contacts a seat formed in the choke assembly, so as to provide a fluid-tight seal, preventing the passage of fluid past the plug and cage. The plug may be arranged coaxially within the cage or coaxially exterior of the cage, known in the art as an external sleeve.

US 2007/0095411 discloses a fast closing well choke. The choke, described as being conventional, has a cage outer sleeve and a cage inner sleeve, both comprising cylindrical members arranged coaxially. Apertures extend radially through the inner and outer sleeves. A cylindrical plug is moveable within the inner sleeve. The figures of US 2007/0095411 show the choke in cross-section only and two rows of apertures are visible in the cross-sectional views. However, no details are shown or described of the distribution of the apertures around the cage sleeves.

Conventional chokes generally have a plurality of apertures through the cage, the apertures being of a variety of diameters and arranged in a staggered pattern around and along the cage. Further examples of conventional chokes are the control chokes commercially available from Cameron Flow Control, Cameron International Corporation, Texas, United States of America.

It will be appreciated that the efficiency of the choke assembly in controlling the fluid flowrate and pressure is dependent upon the integrity of the seal between the plug and the cage and the seal between the end of the plug and the seat in the closed position. A particular problem exists with the aforementioned conventional design of plug and cage choke assembly, in that the flow of fluids through the apertures past the end of the plug erodes the surfaces of both the plug and the cage. In particular, the fluid stream acts to erode and cut into the sealing end portion of the plug. Erosion of the sealing end portion of the plug reduces the effectiveness of the plug in sealing the apertures in the cage, in turn reducing the efficacy of the choke in controlling fluid flow and pressure. In addition, the erosion of the sealing end portion of the plug reduces the efficiency of the seal between the end portion and the seat of the plug when in the closed position. This in turn results in the choke assembly allowing fluid to continue flowing when in the closed position. In a case of long term and persistent erosion, the choke assembly can be rendered entirely inoperative in preventing or controlling the flow rate and pressure of the fluid stream.

It will be further appreciated that the rate and extent of erosion will depend upon the flowrate and composition of the fluid stream being handled. Fluid streams containing significant amounts of entrained solids will give rise to a very high rate of erosion of the both the plug and the cage, very rapidly reducing the efficiency of operation of the choke assembly.

A choke assembly in which significant erosion has taken place will require servicing and/or replacement. This is preferably avoided in any fluid processing installation. However, the servicing of choke assemblies is a particular problem in the case of processing installations in remote or difficult-to-reach locations. This problem is particularly acute in the case of choke assemblies installed in subsea wellhead installations.

The production of fluid streams from a subterranean well is controlled by at least one, generally a plurality, of choke assemblies mounted in the wellhead installation. The replacement of a choke assembly in a wellhead installation may be particularly difficult if the choke assembly is required in order to maintain the integrity of the well. This problem is exacerbated in the case of wellhead installations installed on subsea wells, where the wellhead installation is located on the seabed. The great depths at which the wellhead installations are deployed make access for servicing and maintenance very difficult. This is a particular problem with subsea choke assemblies, as the fluid streams produced from subterranean wells generally comprise substantially amounts of entrained formation solids, such as sand and gravel, together with debris that may be generated as a result of drilling and other downhole operations.

It will therefore be appreciated that there is a need for choke assemblies, in particular those to be installed in subsea locations, to have a high resistance to fluid erosion.

One approach taken in the art to reduce the erosion of plug and cage assemblies in chokes is to form the components exposed to the fluid stream from erosion resistant materials, for example tungsten. Examples of chokes incorporating such technology are known in the art and are commercially available, for example ex. Cameron Willis. In addition to erosion resistant materials, the chokes employ a multi-stage trim design, in which a plurality of coaxially arranged cages or sleeves are used, the sleeves having holes that are specifically aligned so as to force individual fluid jets to change direction repeatedly. In this way, it is alleged that the high energy, velocity and turbulence of the fluid stream are dissipated and controlled within the confines of the trim, avoiding erosion damage to the pressure containing boundaries of the choke assembly.

For applications involving fluids with significant entrained solids, it is common practice in the art to form various components of the choke assembly from materials having a high resistance to erosion, in particular those components on which the fluid stream is likely to impinge during operation. Thus, the aforementioned commercially available chokes have critical components formed from tungsten carbide. This material is expensive and particularly difficult to machine and form into complicated components, such as may be required for a choke assembly.

Tungsten, often employed to provide erosion resistance to choke components, is very brittle. As a result, tungsten components, such as the cage and the like, can crack if impacted by a large solid particle, such as may be produced by a subterranean well during a variety of operations. If there is a likelihood of such damage arising, the tungsten cage may be surrounded by a softer material, such as stainless steel, to prevent particles impacting directly onto the tungsten components.

In addition, the chokes comprise a sacrificial plug nose disposed on the end of the plug. The plug nose is impacted by the fluid stream during normal operation, instead of other critical components, such as the sealing surfaces of the plug. In use, the sacrificial plug nose is eroded by the aggressive fluid stream, in place of the more sensitive sealing components. While the provision of such a feature may prolong the lifetime of the choke, erosion will nevertheless occur, leading to the eventual failure of the choke, requiring it to be replaced and/or serviced.

Finally, the chokes are provided with a so-called 'dead band', allowing the stem of the choke assembly to travel between 5 and 10% before any significant flow can pass through the choke. This arrangement is intended to move the seating face of the plug, that is the end surface of the plug which in use defines a boundary of the flow passage through the choke and seals the plug against the seat, away from the main flow path, such that the fluid is directed onto the specially designed sacrificial areas of the choke assembly, such as the nose. Again, this arrangement still requires critical components to be directly in the path of fluid flow through the choke, leading in turn to erosion of the choke components and eventual failure.

Accordingly, there is a need for an improved choke design that reduces the erosive effect of fluid streams on the critical components of the choke assembly, in particular the plug and the cage, whether the plug is within or exterior to the cage.

SUMMARY OF THE DISCLOSURE

According to the present invention, there is provided a choke assembly comprising:
a choke element having a fluid flow passage therethrough, the choke element comprising:
a cage having a plurality of apertures therethrough for the passage of fluid; and
a plug moveable with respect to the cage, the plug having an end surface that in use defines a boundary of the fluid flow passage through the choke and being moveable to open or close each of the apertures through the cage, to thereby control the flow of fluid through the cage;
wherein the apertures in the cage are disposed in a first and second portion of the cage, each of the first and second portions having a least one aperture therein, the first and second portions being separated by a land;
whereby the plug may be positioned with its end surface disposed to intersect the land between the first and second portions, such that each aperture is fully open or fully closed to the flow of fluid.

In the choke assembly of the present invention, the cage is provided with a plurality of apertures extending therethrough, which may be selectively opened or closed by appropriate positioning of the plug, thus allowing the flow of fluid through the choke to be controlled. The apertures are arranged into two or more portions of the cage, each portion being separated from its adjacent portion by a land, that is a portion of the cage with no apertures permitting fluid flow. The plug may be positioned such that its end face intersects the land between adjacent portions of the cage with apertures. In this way, each aperture is either fully open to the flow of fluid or fully closed. By having the end face of the plug positioned across a land between the apertures, the flow of fluid is not caused to impinge upon or cut across the end face of the plug. This in turn significantly reduces or eliminates the erosion of the plug, in particular the sealing surfaces of the plug, by the fluid stream. This improvement is particularly significant when the choke assembly is handling fluid streams with significant quantities of entrained solids.

The choke assembly may have the cage disposed within the plug. In a preferred embodiment, the plug is disposed coaxially within the cage. This preferred arrangement is particularly advantageous in reducing the erosion of the sealing surfaces of the plug when handling solid-containing fluid streams.

The plug and cage are moveable longitudinally with respect to one another. Most preferably, the cage is fixed and the plug is moveable in relation to the cage, to selectively cover or uncover one or more apertures, as required to control the flow of fluid through the choke assembly.

The plug and cage may be moved with respect to one another by any suitable actuator. Suitable actuators for plug and cage choke assemblies are well known in the art and are commercially available.

The plug is movable with respect to the cage, such that each aperture in the cage may be open, that is partially or wholly uncovered by the plug, or closed, that is covered by the plug. The plug has an end surface that extends across the cage. When the plug is in a position with respect to the cage that one or more apertures are open, the end surface of the plug provides a boundary for a fluid flow path extending from the inlet of the choke assembly, through the open apertures in the cage to the outlet of the choke assembly. The end surface may act to seal the choke by contacting a seat in the choke assembly, when the choke is in the closed mode, with the plug covering all the apertures in the cage and preventing fluid flow through the choke. The end surface of the plug may be any suitable shape or configuration. It is preferred that the end surface is flat, preferably extending perpendicular to the wall or walls of the cage and the side wall or walls of the plug. The plug may be formed with a shoulder extending between the end surface and the side wall of the plug.

The plug is most preferably circular in cross-section, to cooperate with a cage of similar circular cross-section, as is well known in the art.

As noted, the apertures are arranged into discrete portions of the cage, separated by a land, that is a portion of the cage in which no apertures allowing the flow of fluid are present. The apertures may be arranged in any suitable pattern with each portion. In one preferred embodiment, the apertures are arranged in rows extending circumferentially around the cage, with each row comprising one or more apertures. Most preferably, each row comprises two or more apertures.

The apertures may be of any suitable shape. For example, the apertures may be circular openings extending through the cage. Preferably, the apertures have straight sides disposed parallel to the end surface of the plug. Particularly preferred apertures are rectangular, with the sides of the rectangular opening disposed parallel to and orthogonal to the end surface of the plug. In this way, the edge of the end surface of the plug is aligned with the sides of the opening. This ensures that, as the end surface of the plug passes across an aperture, the size of the opening available for fluid flow is readily determined and controlled by the position of the plug. In addition, the use of rectangular apertures reduces the rate at which the end surface of the plug is eroded by the fluid flowing through the aperture when fully or partially open.

As noted, the apertures are distributed between at least two portions of the cage, with the two portions separated by a portion of the cage without apertures therethrough, herein referred to as a 'land'. Each portion comprises at least one aperture. The portions of the cage with apertures therethrough are arranged such that the plug may be positioned relative to the cage, such that each aperture is either fully open or fully closed. In particular, the plug is positioned such that the edge of the end surface of the plug extends across the land of the cage. In this way, the fluid flowing through the open apertures is not caused to flow or cut across the edge of the end surface of the plug. This in turn reduces or eliminates the tendency of the fluid flow to erode the edge of the end surface of the plug and erode the body of the plug itself.

The presence of the land between adjacent portions of the cage with apertures therethrough provides the cage with a full mechanical hoop ring area, that is an area extending circumferentially around the cage in which it is possible to draw continuous lines unbroken by one or more apertures. This in turn provides the cage with additional strength in the very region of a conventional cage that is vulnerable to damage. In particular, this provides the cage with an increased resistance to being damaged, in particular fractured, by the impact of entrained solid materials on the surface of the cage. It is common for cages of conventional design to be cracked and shattered by the impact of large solid particles entrained in the fluid stream. Typically, such a cage will fail by the propagation of cracks around the cage circumference extending between the apertures. This effect is reduced and the resistance of the cage increased by the provision in the cage of the choke of the present invention of the solid, unbroken lands between adjacent portions with apertures therethrough.

In one preferred arrangement, the land between adjacent portions of the cage with apertures therethrough is sufficiently wide that the end surface of the plug may be located at a distance from the adjacent fully open apertures, so as to reduce the impact of fluid flowing through the open adjacent apertures on the body of the plug.

The cage may have two portions with apertures therethrough, separated by a land as described above. Alternatively, the cage may comprise three or more portions with apertures therethrough, with some, or most preferably all, of the adjacent portions being separated by a land.

The apertures may be arranged in any desired or suitable pattern within their respective portion of the cage. In one preferred arrangement, the aperture or apertures of one portion are offset from the aperture or apertures in the adjacent portion, to provide a staggered pattern of the apertures in the longitudinal direction. This offset or staggered pattern further increases the strength of the cage, improving resistance to impact from large solid particles entrained with the fluid stream when in use.

Each portion of the cage with apertures therein may have one or a plurality of apertures therethrough. If a plurality of apertures are present in a portion, they are preferably disposed evenly around the circumference of the cage, in order to ensure a uniform fluid flow pattern through the portion of the cage, when the apertures are open. The portions of the cage with apertures therethrough may have the same number of apertures or a different number. In addition to the number of apertures present in any given portion of the cage, the dimensions of the apertures may also vary. The cage may comprise apertures of the same size, that is present the same cross-sectional area to the flow of fluid therethrough. Alternatively, the apertures may be different in size both within a given portion of the cage and between portions.

In one preferred arrangement, the cross-sectional area of the apertures available for the flow of fluid increases progressively in the longitudinal direction along the cage. In particular, it is preferred that the portion of the cage with apertures therethrough that is the first to be uncovered by the plug as the plug moves from the fully closed position to the open position has the lowest fluid flow area and the last of the portions of the cage to be uncovered as the plug moves to the fully open position has the greatest fluid flow area. The progressive variation in the cross sectional area of the apertures may be achieved by varying the number and/or size of the apertures in adjacent portions of the cage.

The apertures in the cage may extend through the cage wall perpendicular to the inner and outer surface. Thus, in the case of a cylindrical cage, the apertures will extend radially through the cage wall. Alternatively, and more preferably, the apertures extend at an angle to the radial or outwards direction of the choke cage. In this respect, a reference to the apertures being at an angle is to be understood as requiring the apertures to extend at an angle to the radial direction within a plane perpendicular to the longitudinal axis of the cage. Thus, when the cage is viewed longitudinally, the apertures extend through the cage perpendicular to the radial direction. With the choke assembly arranged to have the plug and cage disposed with their longitudinal axes vertical, the angled apertures will extend at an angle to the radial direction horizontally and will be perpendicular to the radial direction vertically. The apertures may all extend at the same angle or, alternatively, the angles of the apertures may differ. It is preferred that all the apertures within a given portion of the cage extend at the same angle. All the apertures in the cage may extend through the wall of the cage at the same angle. In a particularly preferred arrangement, the apertures extend tangentially to the inner wall of the cage. In this way, the fluid flowing through the apertures into the interior of the cage generates a rotating or helical flow pattern within the cage. This preferred arrangement is discussed in more detail below.

In operation, the fluid stream to be choked or controlled is introduced through an inlet in the choke assembly to an annular cavity extending around the outside of the plug and cage assembly. With the choke assembly in the fully closed position, the plug is fully extended with respect to the cage, with the end surface of the plug in contact with and sealed against the seat. In this position, all the apertures extending through the cage are covered and closed by the plug, thus preventing fluid from flowing to the outlet of the choke assembly. As the plug is moved with respect to the cage from the closed position, the end surface of the plug is moved away from its seat. As the end surface of the plug passes the first portion of the cage with apertures therethrough, the apertures are opened and fluid is allowed to flow through the cage to the outlet of the choke assembly. The extent of fluid flow is controlled by appropriate positioning of the plug with respect to the cage. As the plug is moved towards the fully open position, increasing numbers of apertures are uncovered and the cross-sectional area available for fluid flow increases.

When positioning the plug with respect to the cage to control the flow of fluid through the choke assembly, the plug is preferably positioned such that the end surface of the plug extends across a land between two adjacent portions of the cage with apertures therethrough. When in this position, the edge of the end surface of the plug is not exposed to the cutting and eroding action of the fluid flowing through the apertures of the cage. The apertures in a given row are preferably offset or staggered in the circumferential direction in relation to the apertures in adjacent rows. This results in different portions of the plug being exposed to the fluid flowing through the apertures, as the plug is moved relative to the cage and traverses the rows of apertures. This prevents the wear due to fluid erosion from being concentrated in specific regions of the plug and distributes the wear across the entire surface of the plug, in turn prolonging the operational life of the plug. In one preferred embodiment of the choke assembly, the cage has the adjacent portions with apertures therethrough spaced apart, such that the end surface of the plug is at a distance from the fluid stream passing through the adjacent open aperture or apertures. In this way, the erosive effect of the fluid stream is further reduced, as described above.

As noted, in operation, the plug is moved relative to the cage, in order to control the flow of fluid through the choke assembly. To achieve this, the choke assembly comprises an actuator to move and position the plug with respect to the cage. The actuator may be of any suitable design and configuration. Suitable actuators are well known in the art and are commercially available. However, it is a feature of the choke assembly of the present invention that a programmable actuator assembly may be employed. The actuator is programmed to position the plug according to data or instructions received regarding the conditions of the fluid flow. The actuator may be programmed to move the plug in any suitable regime. For example, the plug may be moved from a first position to a second position at a substantially constant speed. In one preferred arrangement, the actuator is programmed to move the plug from a first position at an initial slow speed, thereafter increasing the speed of movement of the plug, and finally completing the movement of the plug to the second position at a slow speed. As already discussed, the second position of the plug is most preferably one in which the end surface of the plug extends across a land between adjacent portions of the cage with apertures therethrough. This regime for moving the plug relative to the cage is advantageous in reducing high shock loads on the assembly, due to rapid changes in the inertia of fluid through the choke and improves accuracy of the flow control allowing a finer control of the fluid flow to be achieved. This in turn can help prevent the control system from hunting, again improving the accuracy of the fluid control.

In general, it is advantageous to employ programmable actuators for choke assemblies. Programmable actuators allow the pressure and flowrate of the fluid stream to be continuously controlled and adjusted, ensuring that the pressure/flow system functions accurately within the design limits. An actuator to move the plug both rapidly and accurately will allow the process hardware to be designed and constructed with higher tolerances and with less float or fluctuation tolerance volume, allowing the separation hardware to be more compact.

According to a further aspect of the present invention, there is provided a method of controlling the flow of a fluid, the method comprising:

passing the fluid through one or more apertures in a cage, the cage having a plurality of portions having apertures therethrough for fluid flow, adjacent portions of the cage being separated by a land having no apertures for fluid flow therethrough;

positioning a plug with respect to the cage to selectively close some, but not all, of the apertures in the cage;

wherein the plug has an end face defining a boundary of the fluid flow passage through the cage, the plug being positioned with the end face of the plug extending across a land between adjacent portions of the cage.

The present invention has been described in terms of a complete choke assembly. However, it will be appreciated that the particular arrangement of the cage of the choke assembly may be provided as a separate component, for example for use in repairing or refitting existing, choke assemblies of conventional design.

Accordingly, the present invention further provides a cage assembly for use in a fluid choke assembly, the cage assembly comprising:

a cage having a cage wall, the cage wall having a plurality of portions, each portion having one or more apertures therethrough for fluid flow, wherein adjacent portions of the cage are separated by a land having no apertures therethrough.

As described hereinbefore, one embodiment of the choke assembly comprises a cage having apertures, preferably rectangular apertures, extending through the wall of the cage at an angle to the radial direction, more particularly tangentially to the inner surface of the cage. While applicable to the chokes assembly of the present invention, a cage having apertures with this arrangement provides a number of advantages for plug and cage type choke assemblies in general.

Accordingly, in a further aspect, the present invention provides a choke assembly comprising:

a cage comprising a cage wall having a plurality of apertures therethrough for the flow of fluid, the apertures extending through the cage wall tangentially to the inner surface of the cage wall.

The apertures through the cage wall are most preferably rectangular in cross-section. In this respect, the rectangular apertures are preferred to form an annular or toroidal band of fluid flowing within the cage, as described hereinafter. Alternative shapes of aperture may be employed, although the formation of well defined annular bands of fluid may be less. The rectangular apertures may have any suitable aspect ratio, in the range of from 1:1 to 1:10, more preferably to 1:5.

The apertures are most preferably arranged in one or more bands or rows extending circumferentially around the cage. Most preferably, the cage comprises a plurality of such bands or rows. The apertures in adjacent bands or rows may be aligned with one another, but are more preferably offset. Adjacent bands or rows are preferably separated by a land, as hereinbefore described.

The cage comprises at least one band or row of apertures, with the band or row having at least one aperture therein. More preferably, the band or row comprises two or more apertures and, for example, may comprise from two to ten, more preferably from two to eight apertures. The apertures may be of different sizes, that is, of different cross-sectional areas. However, it is preferred that the apertures within the band or row have the same cross-sectional area. In one preferred embodiment, the cage comprises a plurality of such bands or rows of apertures, with the number of bands or rows ranging from 2 to 20, more preferably from 2 to 12.

In one embodiment, it is preferred that the total cross-sectional area of the apertures in the cage available for fluid flow is greater than the cross-sectional area of the bore of the cage. Alternatively, the total area of the apertures in the cage available for fluid flow may the same as or less than the cross-sectional area of the inner passage within the cage.

In order to prevent the cage from unnecessarily restricting the flow of fluid through the choke when the choke assembly is fully open, it is preferred that the total area of the apertures available for the flow of fluid is greater than the cross-sectional area of the fluid inlet of the choke assembly.

In use, the choke of this aspect of the invention operates under a combined regime of physical choking or throttling of the fluid flowing through the apertures in the cage and hydraulic choking or throttling. Conventional choke assemblies reduce the pressure and control the flow of fluid by a virtue of the cage providing a physical barrier to the flow of fluid, thus increasing the pressure drop of the fluid forced to flow through the cage. Varying the total cross-sectional area of the apertures through the cage available for the flow of fluid in turn varies the pressure drop and allows the flow to be controlled. To dissipate the energy of the fluid flow the cage having a plurality of apertures is used to direct a plurality of jets of fluid into the centre of the cage, causing the jets of fluid to collide, shearing the fluid and dissipating the energy of the fluid stream.

In addition, the choke assembly of the latter aspect of the present invention provides a hydraulic throttling of the fluid flow, as follows. When the choke assembly is in an open position, fluid is caused to flow through the apertures in the cage towards the interior of the cage assembly. As a result of the form of the apertures, the fluid stream passing through a given aperture is caused to flow circumferentially along the interior wall of the cage in a circular pattern. In this way, the fluid flowing along the interior wall from one aperture is caused to flow across the adjacent aperture in the direction of fluid flow. With the apertures arranged in bands or rows as afore-described, the fluid entering through one aperture is forced to flow across the inner opening of the adjacent aperture in the row. This cross-flow of fluid presents a barrier to fluid entering the cage through the adjacent aperture. To enter the interior of the cage, fluid entering the adjacent aperture must divert the cross-flowing fluid from its circular path. This change in direction and change of momentum of the fluid generates a back pressure or pressure drop on the fluid. Fluid entering the cage as described is allowed to leave the cage through the centre of the band or annulus of circulating fluid, and pass to the outlet of the choke assembly.

The action of the fluid flowing within the cage of the choke to provide a resistance to the flow of fluid entering the cage is referred to as 'hydraulic choking' herein and is characterised by a band or toroid-like annular pattern of fluid flowing in a circular pattern around the inner surface of the cage. The resistance to the flow of fluid through an aperture by the formation of an annular band of fluid circulating within the cage across the inner opening of the aperture is a first form of hydraulic choking.

As discussed above, the cage of the coke assembly may comprise a single band or row of apertures. In such a case, operation of the choke is characterised by a single annular band of fluid circulating within the cage of the choke, with fluid entering the cage through the tangential apertures and leaving through the central passage defined by the annular fluid flow pattern. As also discussed above, the choke assembly may comprise a cage having a plurality of bands of apertures. Each such band is preferably arranged with tangential apertures, and, in operation, will establish a circulating annular band of fluid within the cage extending across the inner openings of the apertures within the said band. The operation of such a choke assembly is characterised by a plurality of annular fluid bands within the cage each being supplied with fluid from the apertures of the respective row of apertures in the cage. The bands are established in a 'stacked' pattern extending in the downstream direction within the cage. In this pattern, the fluid from an upstream annular band is caused to flow through the opening within the adjacent downstream band and the bands thereafter. In this respect, the openings within each annular band of fluid acts as a hydraulic orifice for the flow of fluid from annular bands upstream. As the diameter of the hydraulic orifice is less than the internal diameter of the cage, the hydraulic orifice provides a greater resistance to the flow of fluid from upstream annular bands than the cage itself. The cross-sectional area of the downstream flow path from a given annular fluid band will depend upon the number of downstream annular fluid bands. As the number of downstream bands increases, the cross-sectional area available for the fluid to leave the cage is decreased. Thus, the downstream annular fluid bands act to provide a resistance to, that is choke, the flow of fluid from the upstream bands, providing a second form of hydraulic choking within the choke assembly.

The number of annular bands established within the cage during operation may be determined by the position of a plug moved with respect to the cage. The plug and cage may be of largely conventional design in other respects. In a preferred arrangement, the plug and cage assembly is as hereinbefore described in connection with the earlier aspects of the present invention.

The size, and thus the resistance to flow within the cage, provided by a given annular band is governed by the size, number and shape of the apertures within the relevant band or row of the cage. The features of the apertures may thus be selected accordingly. In general, it is preferred that the total cross-sectional area of the apertures in a row or band in the cage increases in the upstream direction within the cage. This increase in cross-sectional area may be provided by a higher number of apertures and/or apertures of a larger cross-sectional area within the band or row.

In a further aspect, the present invention provides a method of controlling the flow of a fluid, the method comprising:

providing a fluid control zone having a fluid inlet with an inlet aperture and a fluid outlet;

supplying a fluid through the inlet aperture into the fluid control zone;

establishing an annular fluid flow pattern within the fluid control zone, in which pattern fluid is caused to circulate in an annular region, such that fluid within the annular flow pattern is caused to flow across the opening of the inlet aperture and provides a resistance to the flow of fluid through the inlet aperture;

wherein the annular fluid flow pattern defines a hydraulic orifice within the fluid control zone through which fluid is caused to flow to leave the fluid control zone through the fluid outlet.

The annular fluid flow pattern may be established by providing a fluid inlet aperture that is at an angle to the general direction of fluid flow within the fluid control zone from the fluid inlet to the fluid outlet. That is, the aperture extends at angle to the radial direction of the cage in a plane perpendicular to the longitudinal axis of the cage, as hereinbefore described. The aperture is preferably arranged at a tangent to the fluid control zone. The annular fluid flow pattern may be established using a single aperture, most preferably an aperture extending tangentially to the fluid control zone. As mentioned above, the annular fluid flow pattern is preferably established using a plurality of apertures disposed in a band around the fluid control zone. In this way, fluid entering the fluid control zone through one aperture is caused to flow in a circulating pattern within the annular region of the fluid control zone and to flow across the opening of the apertures disposed in the direction of flow.

As described hereinbefore, the method may comprise establishing a single annular fluid flow pattern within the fluid control zone. Most preferably, the method comprises establishing a plurality of annular fluid flow patterns within the fluid control zone and arranged along the flowpath in the fluid control zone between the fluid inlet and the fluid outlet. To achieve this, the method preferably employs a plurality of bands of fluid inlet apertures, with each band comprising one or more apertures, as hereinbefore described. The number of annular fluid flow patterns may be controlled using a control member moveable with respect to the fluid control zone to selectively open and close the apertures of a given band.

In a preferred arrangement, the fluid control zone is within the cage of a choke assembly, the one or more inlet apertures extending through the wall of the cage. The control member is preferably provided by a plug moveable with respect to the cage to selectively open and close the apertures extending through the wall of the cage.

The choke assembly and method of the present invention in its various aspects may be used to control the flow of fluids in general, in particular the flow of streams of liquid. As mentioned hereinbefore, the present invention is particularly suitable for the processing of fluid streams, whether liquids, gases or a combination thereof, with entrained solids. The present invention is particularly advantageous when applied to the processing of fluid streams produced from subterranean oil and gas wells. The apparatus of the present invention is sufficiently compact and efficient that it is particularly suitable for use in subsea installations, such as wellhead installations and the like, for the control of fluid streams produced by a subsea well during operation. In operation, the method and apparatus of the present invention subject the fluid stream to less shear forces than conventional or known choke assemblies. This is particularly advantageous in the processing of multiphase liquid streams, whether or not with entrained solids and gas. The reduced shear in the liquid stream in turn acts to maintain the separation of the phases in the multiphase liquid. In particular, in the case of streams comprising oil and water, such as produced by subterranean wells, the high shear applied to the liquid stream by known apparatus results in the oil and water phases becoming highly dispersed, even to the extent of forming a stable or quasi-stable emulsion. The separation of such a liquid stream into its individual phases is then very difficult, as is often required, for example when seeking to produce oil from a well and return water underground by reinjection.

Accordingly, in a further aspect, the present invention provides an installation for the processing of fluid streams produced by a subterranean well, in particular a subsea installation, comprising a choke assembly as hereinbefore described. The installation may be a wellhead assembly.

BRIEF DESCRIPTION OF THE DRAWINGS

Specific embodiments of the method and apparatus of the present invention will now be further described, by way of example only, having reference to the accompanying drawings, in which:

FIGS. 7a and 7b are perspective views of a cage assembly for use with the choke assemblies of FIG. 2;

FIG. 8 is a side view of the cage assembly of FIG. 7a;

FIG. 9 is a plan sectional view of the cage assembly of FIG. 8 along the line IX-IX;

DETAILED DESCRIPTION OF THE DISCLOSED EMBODIMENTS

Figure 1:
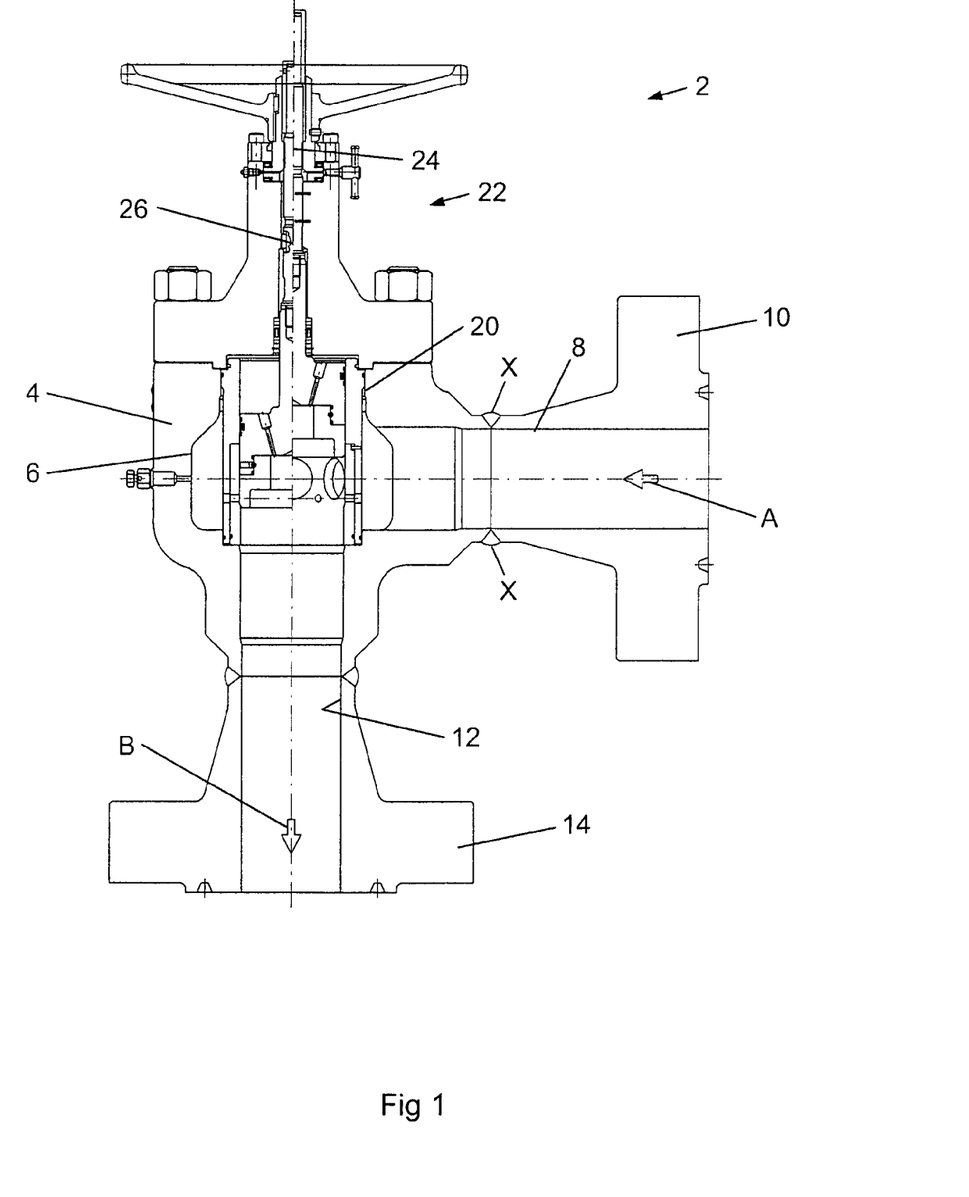
FIG. 1 is a cross-sectional view of a choke assembly.

Referring to FIG. 1, there is shown a choke assembly, generally indicated as 2. The choke assembly 2 is largely of conventional design and comprising a choke body 4 having a generally cylindrical choke cavity 6 formed therein. A fluid inlet 8 is provided in the side of the choke body 4, terminating in a flange coupling 10 of conventional design and provides a passage for fluid to enter the choke cavity 6 from a lateral direction, as indicated by arrow A in FIG. 1. A fluid outlet 12 is provided in the choke body 4, extending longitudinally from the choke cavity 6 and terminating in a flange coupling 14, again of conventional design. The fluid outlet 12 provides a passage for fluid leaving the choke cavity 6, as indicated by the arrow B in FIG. 1. The choke assembly further comprises a choke element, generally indicated as 20, of the plug-and-cage type, disposed coaxially within the choke cavity 6, as will be described in more detail hereafter. An actuator assembly 22 is mounted on the choke body 2 and comprises an actuator 24, connected to the choke element 20 by an actuator shaft 26 extending coaxially within the choke body 4 to the choke cavity 6 and operable to manipulate the choke element 20 in the choke body. Suitable actuator assemblies are known and commercially available in the art. The left hand side of FIG. 1 shows the choke assembly in the fully closed position, while the right hand side of the figure shows the choke assembly in the fully open position.

Figure 2:
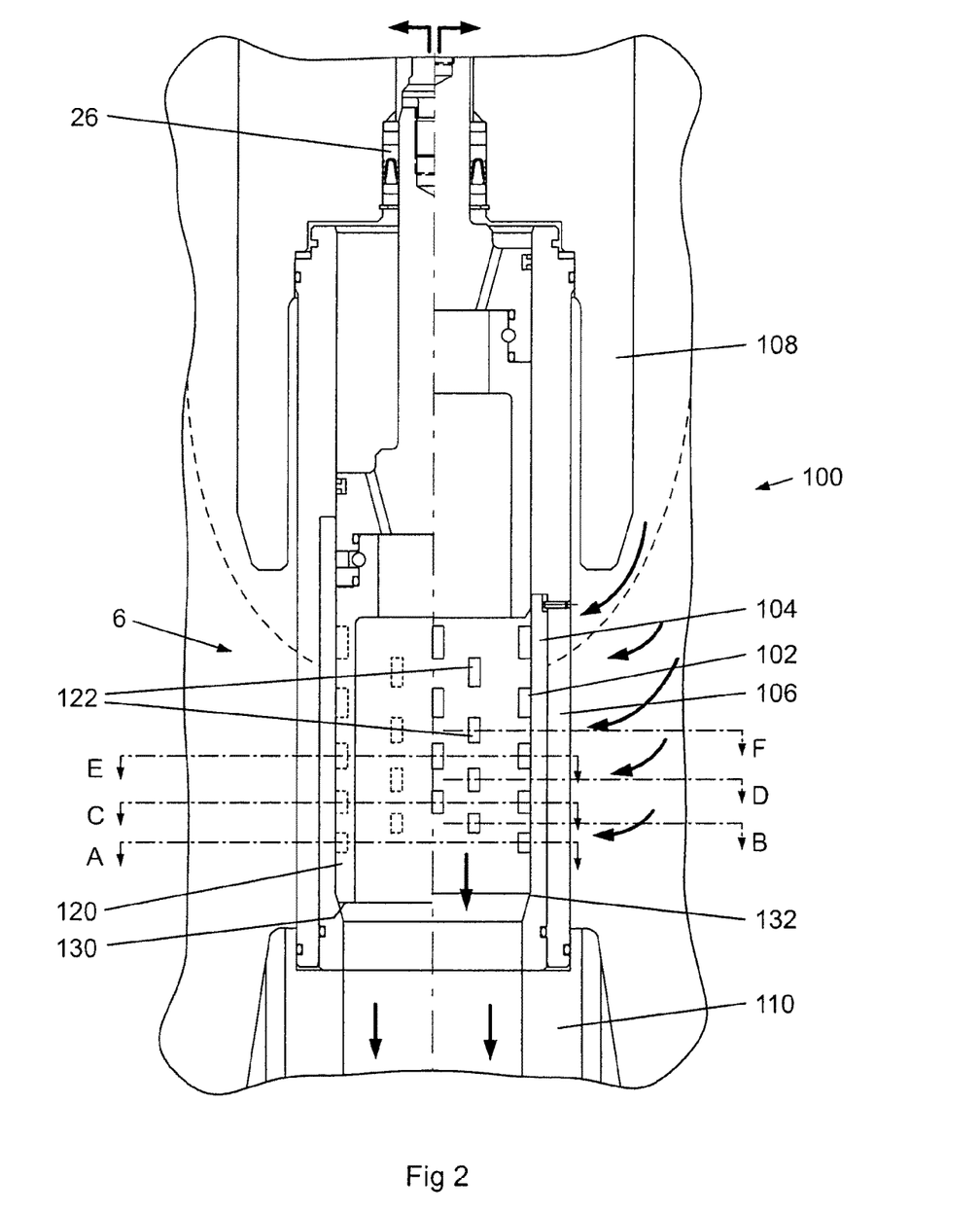
FIG. 2 is detailed cross-sectional view of a choke assembly according to one embodiment of the present invention.

Referring to FIG. 2, there is shown a detailed view of a choke element according to the present invention, generally indicated as 100. It will be understood that the choke element 100 is not limited in its use to the choke assembly of FIG. 1 and can equally well be applied in the choke assemblies of other embodiments of the present invention, as well as choke assemblies falling outside the scope of the invention. The left hand side of FIG. 2 shows the choke element in the fully closed position, while the right hand side of the figure shows the choke element in the fully open position.

The choke element 100 is of the plug and cage variety and comprises a generally cylindrical cage 102 having an inner cage portion 104 and an outer cage portion 106 arranged concentrically. The outer cage portion 106 is supported between an upper mandrel 108 and a lower mandrel 110 extending within the choke cavity 6. The choke element 100 further comprises a generally cylindrical plug 120 disposed within the cage 102. The plug 120 is connected in conventional manner to the end of the actuator shaft 26 extending from the actuator 24. In this manner, the plug 120 may be moved longitudinally within the cage by a reciprocating motion of the actuator shaft 26 under the action of the actuator.

The plug 120 has an end surface 130 with an external shoulder thereon, which contacts a seat 132 formed in the choke assembly, when the choke is in the fully closed position. The seating of the end surface 130 of the plug against the seat 132 provides a fluid tight seal, preventing fluid from flowing through the choke assembly.

As shown in FIG. 2, the choke element 100 has the plug 120 disposed within the cage 102. It will be understood that the present invention embraces a similar choke element, but in which the plug is disposed outside the cage, that is an external sleeve and internal cage.

The cage 102 is provided with a plurality of apertures 122 through which fluid may flow from the region of the choke cavity 6 into the cage 102. The openings 122 are formed to extend tangentially through the cage 102.

Figure 3:
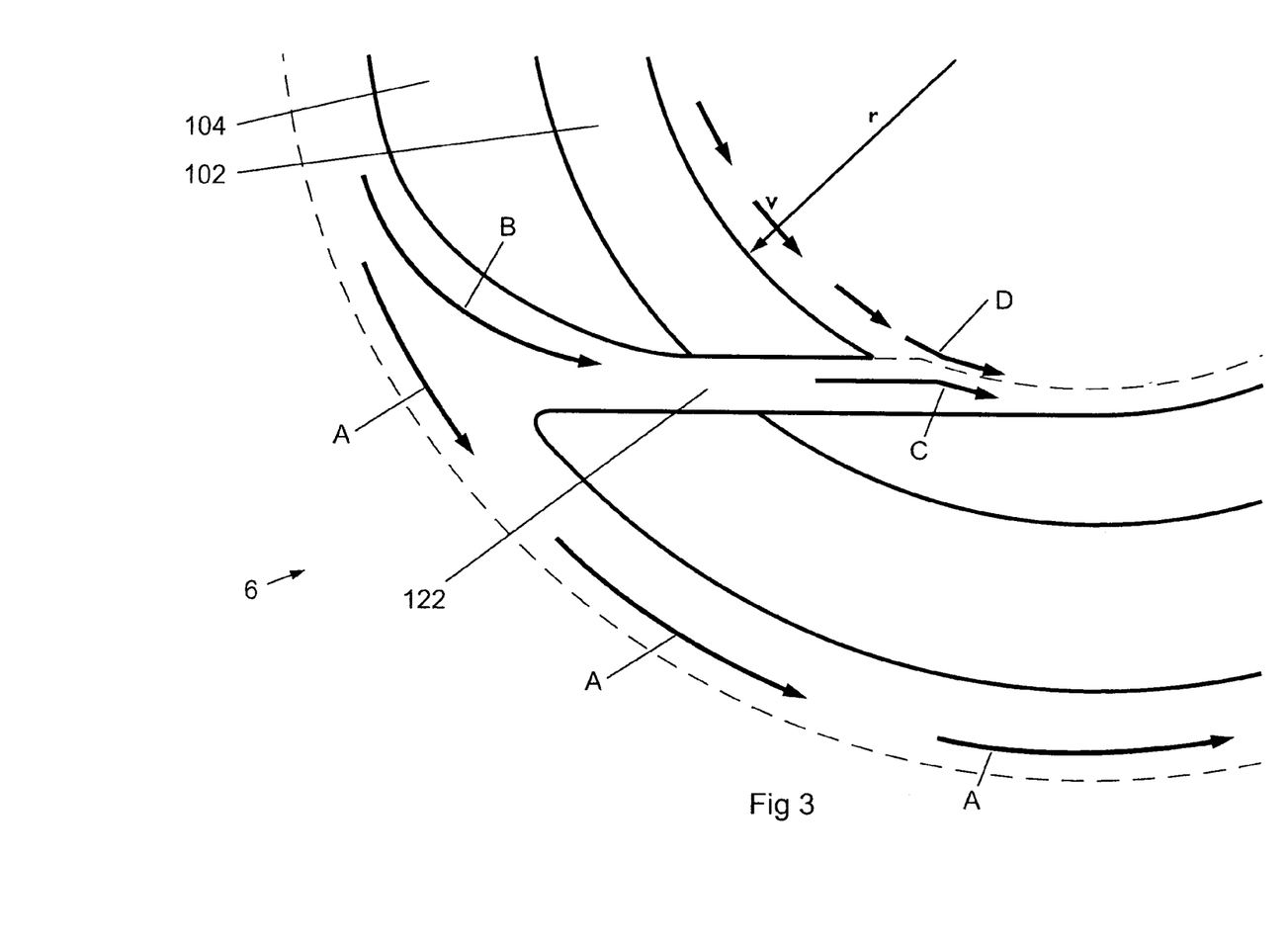
FIG. 3 is a cross-sectional view of a portion of the choke cage of the cage assembly of FIG. 2 showing a detail of the opening therethrough.

Referring to FIG. 3, there is shown a cross-sectional view through a portion of the choke cage 102 showing the form of an opening or aperture 122. Each aperture 122 extends through both the outer cage portion 104 and the inner cage portion 102. The apertures are generally rectangular in cross-section. The portion of each aperture extending through the inner cage portion 102 has a constant cross-sectional area throughout its length. The portion of each aperture extending through the outer cage portion 104 is tapered, with the cross-sectional area of the opening at the outer surface of the outer cage portion being widest, the opening tapering in a radially inwards direction such that the cross-sectional area reduces to that of the opening portion in the inner cage portion. In use, fluid flows around the exterior surface of the cage 102 in a rotational pattern, indicated by arrows A in FIG. 3. As shown in FIG. 3, the taper of the opening portion in the outer cage portion 104 is not symmetrical, but rather is offset in the reverse or upstream direction of fluid flow around the outside of the cage, as indicated by arrows A in FIG. 3.

The fluid flow patterns in and around the cage are shown in detail in FIG. 3. Fluid in the choke cavity 6 is flowing around the exterior of the cage, as indicated by arrows A. The fluid flow pattern around the exterior of the choke will be determined by the form and shape of the choke cavity and the fluid inlet. For example, orienting the fluid inlet 8 of the choke assembly 2 so that fluid enters the choke cavity tangentially or at an angle will result in the fluid flowing in a rotational or circulating pattern around the choke cage. As the fluid passes the outer end of an aperture 122, a portion of the fluid is directed into the opening, as indicated by arrow B in FIG. 3. The offset in the taper in the outer portion of the opening reduces the shear experienced by the fluid as it enters the opening 122. As the fluid passes through the opening, the reduction in cross-sectional area accelerates the fluid velocity, such that upon entering the inner cavity of the choke element, the fluid is travelling at a high velocity. The angle of the opening 122 introduces the high velocity fluid into the inner cavity tangentially, as indicated by arrow C in FIG. 3. As a result of the tangential entry, the fluid within the inner cavity is caused to rotate, as shown by arrows D and flow around the inner wall of the inner choke element 102. Thus, the incoming fluid indicated by arrow C is caused to impact the fluid circulating within the cage and to change direction, as shown in FIG. 3, and follow a flow path close to the inner surface of the inner cage portion 102. The fluid circulating within the cage is in turn caused to deviate from the inner wall of the inner choke element 102 and to move inwards towards the centre of the cage. The changes in direction of flow, and the associated changes of fluid momentum, induce a back pressure or resistance to flow for fluid both entering and within the cage. In this way, the fluid itself is acting to increase the overall pressure drop across the choke assembly, and provide a hydraulic choking action.

The action of the fluid entering the choke cage through the apertures 122 and combining with the fluid already circulating within the choke cage adjacent the inner wall of the inner choke element 102 creates a band of fluid within the cage, such that the fluid is forced to flow in an annular pattern in the radially outer region of the cage across the inner openings of the apertures 122.

Overall, this pattern of flow reduces the degree of shear to which the fluid is subjected, which in turn has the effect of maintaining phase separation that exists in the fluid prior to entering the cage. In addition, as will be appreciated, any solid particles entrained in the fluid are caused to take a circular path within the choke cage, rather than impact the inner wall of the cage. This significantly reduces the wear and failure rates of the choke element.

Figure 4A:
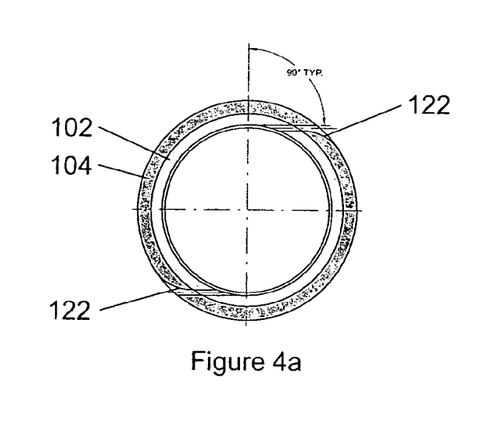
FIGS. 4a to 4f are cross-sectional views through the choke cage of the choke assembly of FIG. 2 along the lines Section A, Section B, Section C, Section D, Section E and Section F, respectively.
Figure 4B:
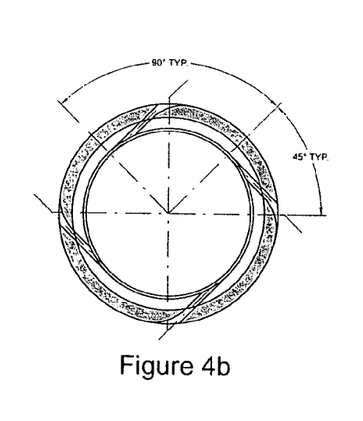
Figure 4C:
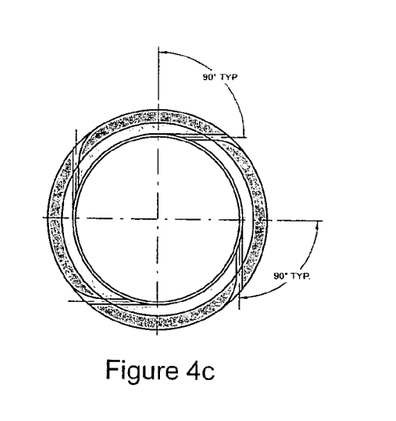
Figure 4D:
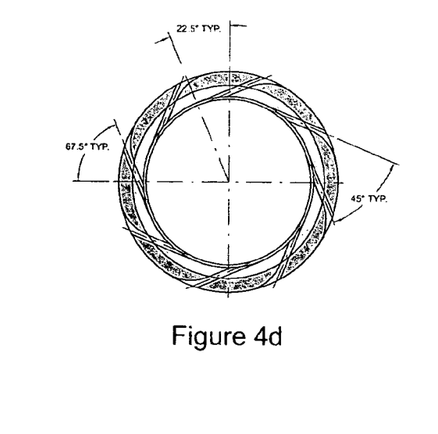
Figure 4E:
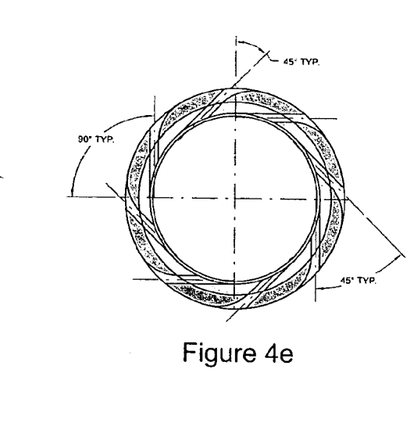
Figure 4F:
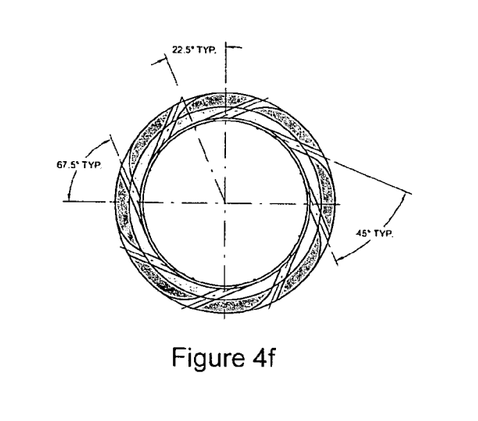

As shown in FIG. 2, the apertures in the choke cage are arranged in bands. The arrangement of apertures in one embodiment of the choke cage are illustrated in the cross-sectional views through six downstream bands of the choke cage shown in FIGS. 4a to 4f. The most downstream band is shown in FIG. 4a and has two tangential apertures 122 arranged at 180° to each other on opposing sides of the cage. The adjacent upstream band, shown in FIG. 4b, has four tangential apertures arranged at 90° to each other on opposing sides of the cage, but offset by 45° to the apertures in the band shown in FIG. 4a. The adjacent upstream band is shown in FIG. 4c and similarly has four apertures arranged at 90° to each other around the cage, offset 45° from the apertures shown in FIG. 4b. The band immediately upstream is shown in FIG. 4d, which also comprises eight openings with a 45° spacing, again offset from the four openings of the adjacent downstream band by 22.5°. The upstream pair of bands is shown in FIGS. 4e, 4f, 4g and 4h each band having eight openings, again offset from one another.

Movement of the plug 120 longitudinally within the cage allows the bands of openings to be covered and uncovered, depending upon the position of the plug, thereby allowing the flow of fluid through the choke element to be controlled. With the plug in the position shown in the left hand side of FIG. 2, all bands of openings are covered and the choke element is closed to fluid flow. Movement of the plug 120 from the closed position first uncovers the band shown in FIG. 4a and then, successively, the bands of FIGS. 4b to 4f, until the fully open position shown in the right hand side of FIG. 2 is reached. It will be appreciated that movement of the plug from the closed position to the open position opens bands having successively a greater number of openings and, hence, providing a successively increasing cross-sectional area available for fluid flow.

Figure 5:
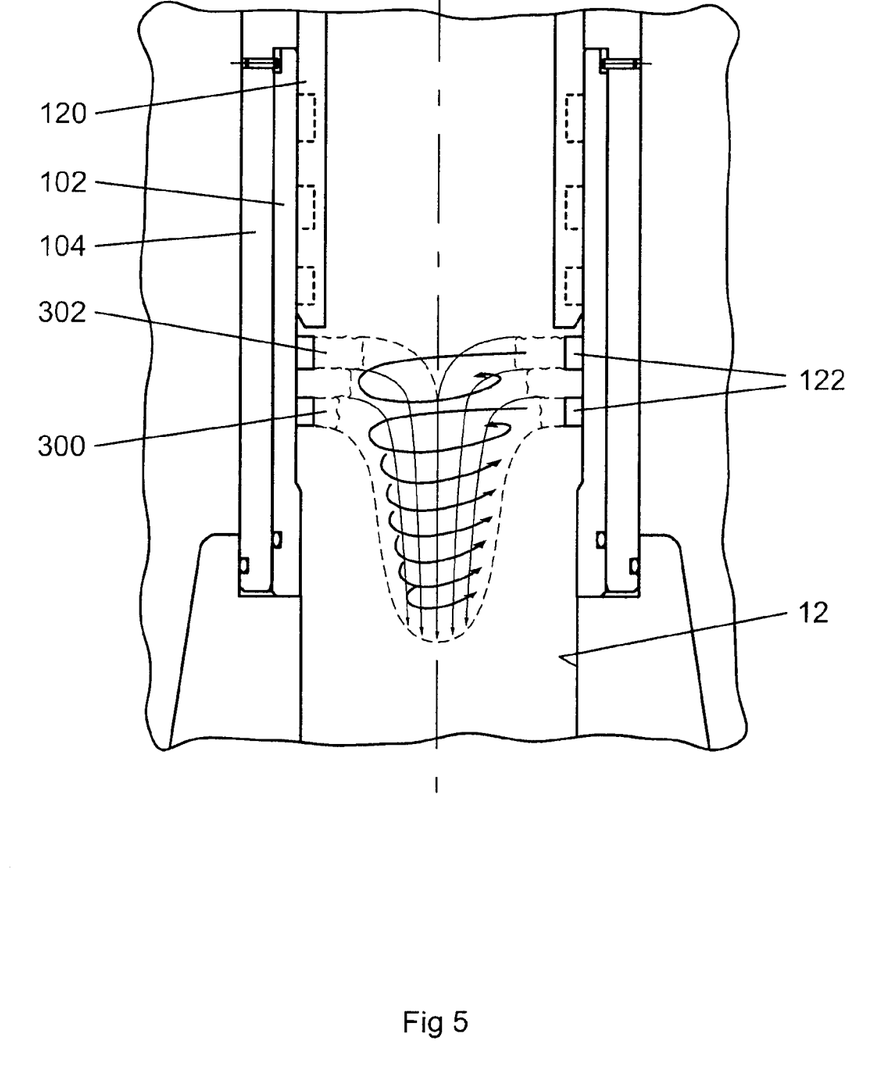
FIGS. 5 and 6 are diagrammatic representation of fluid flow patterns within the choke cage of the choke assembly of FIG. 2, with the plug in a first position and second position respectively.
Figure 6:
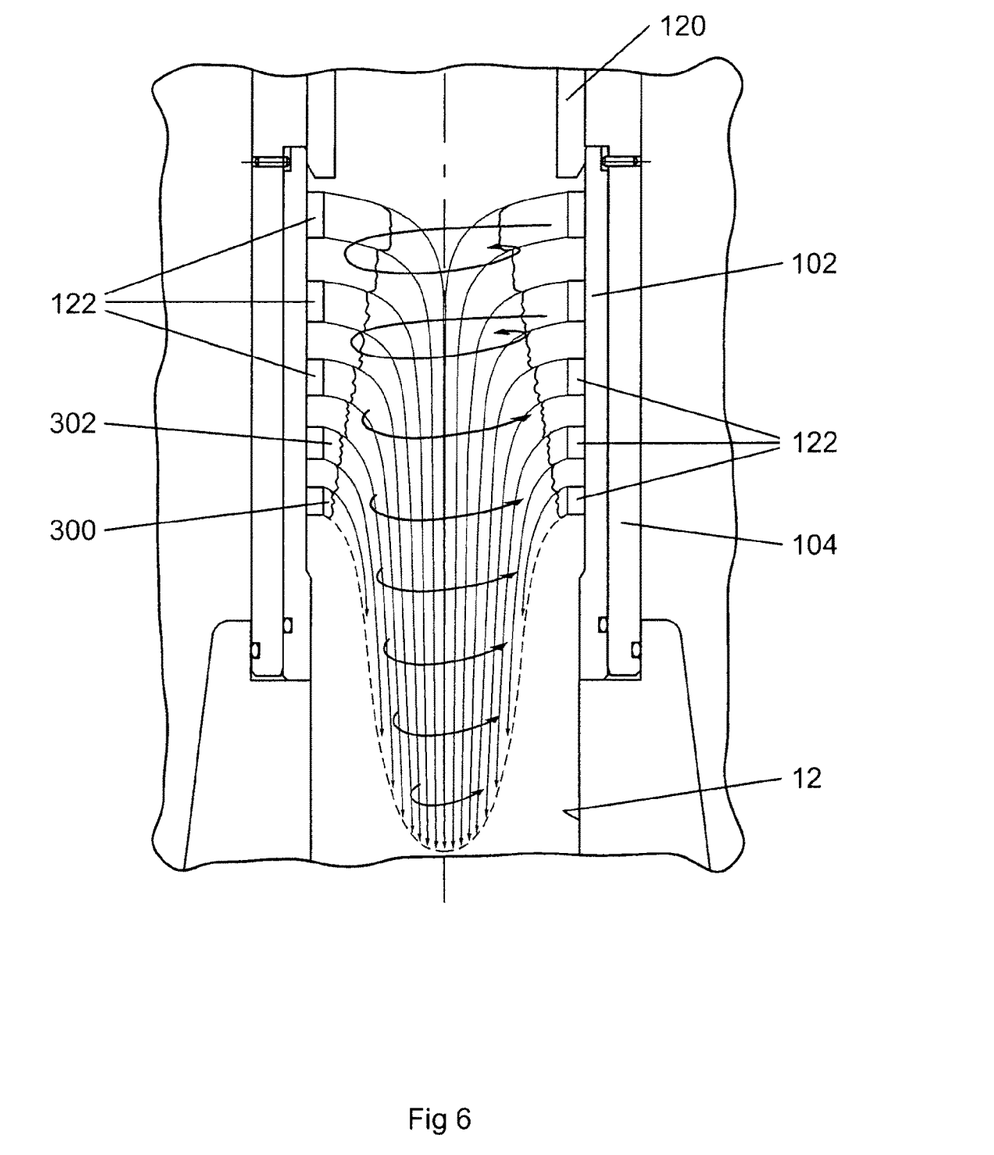

It has been found that the arrangement of the tangential apertures 122 into bands, as described hereinbefore, induces the aforementioned annular fluid flow regime, represented in FIGS. 5 and 6. As described hereinbefore and shown in FIG. 3, the fluid entering the cavity within the cage element is caused to flow in a circular path adjacent the inner surface of the inner cage portion 102, that is form a rotating band of pressurised fluid in the radially outer region of the cage interior. The pressurised band of fluid 300 generated by the downstream band of apertures is shown in FIGS. 5 and 6. The general direction of fluid flow within the choke element is downstream towards the fluid outlet 12 (that is downwards, as shown in FIGS. 5 and 6). However, the effect of the pressure band 300 is to reduce the effective cross-sectional area available for the flow of fluid entering the cage upstream of the band 300. In other words, the pressurised band of fluid acts as a hydraulic choke to the flow of fluid downstream. A similar pressurised band of rotating fluid 302 will be formed by the adjacent upstream band of apertures, which acts to further reduce the effective cross-sectional area available for the downstream flow of fluid.

As shown in FIG. 5, the choke element is in the partially open position, with the plug 120 in an intermediate position between the fully open and fully closed positions and two bands of apertures uncovered for fluid flow. The effect of the hydraulic choke action within the choke cavity is represented. In FIG. 6, the plug 120 is in the fully open position, with all bands of apertures uncovered. The hydraulic choke action of successive fluid bands is shown. The fluid entering the cavity through a given band of apertures must flow in the general downstream direction. To do this, the fluid is caused to flow inwards, past the pressurised band of fluid established by the fluid entering the adjacent downstream band of apertures. As shown in FIG. 6, the cumulative effect of the pressurised bands of fluid results in the fluid entering the choke cavity through the most upstream bands of apertures having a very limited cross-sectional area available for flow past the downstream fluids bands.

This hydraulic choke action of the pressurised fluid bands acts in addition to the physical choking action provided by the flow of fluid through the apertures in the choke cage, as well as the hydraulic choking as described hereinbefore and shown in FIG. 3 as the fluid is forced to enter the cage through the tangential apertures. The hydraulic choke action can be employed to control the flow of fluid downstream of the choke element, but has the advantage of subjecting the fluid to significantly less shear than the components of the choke element, such as would be experienced in a conventional plug and cage choke assembly.

Figures 7A, 7B, 8, 9:
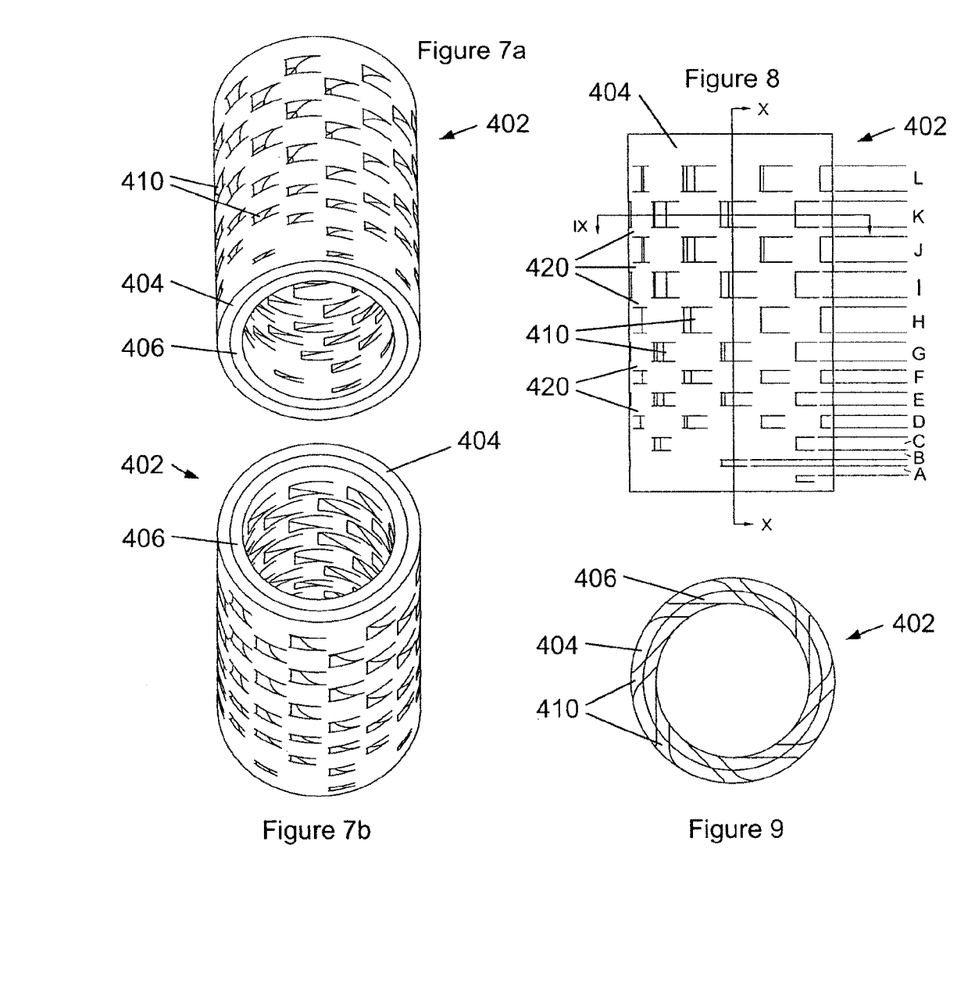
Figure 10:
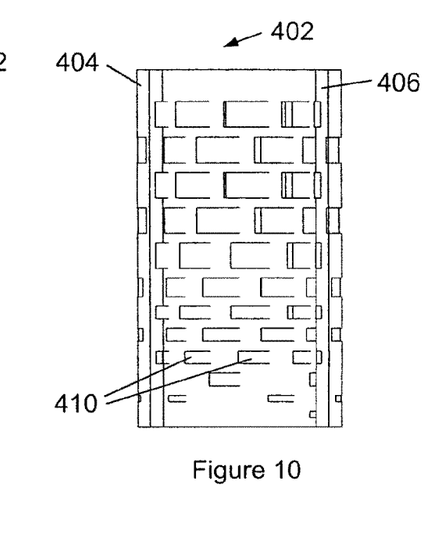
FIG. 10 is a cross-sectional view of the cage assembly of FIG. 8 along the line X-X.

Referring to FIGS. 7a and 7b, there is shown a cage assembly, generally indicated as 402, that may be used in a plug-and-cage type of choke assembly, such as that shown in FIGS. 1 and 2. As shown in FIGS. 7a and 7b, the cage assembly comprises an outer, generally cylindrical cage member 404 and an inner, generally cylindrical cage member 406, disposed concentrically within the outer cage member 404. The outer and inner cage members 404, 406 are formed of any suitable material, resistant to the conditions prevailing during the operation of the choke. For use in the processing of fluid streams produced from an oil or gas well, the inner cage member 406 is preferably formed of a resistant metal, in particular tungsten carbide. The outer cage member 404 is prepared from a suitably hard material, for example stainless steel, and acts in use to protect the inner cage member 106 from direct impact by large solid particles entrained in the fluid stream.

As shown in FIGS. 7 to 10, apertures 410 extend through both the outer and inner cage members 404 and 406, providing passages for the flow of fluid from the inlet of the choke assembly, through the cage and to the outlet of the choke assembly. The apertures 410 are arranged into 12 rows or bands, indicated in FIG. 8 by the letters A to L. The apertures 410 have the same general form, as shown in cross-section in FIG. 9. As shown in FIG. 9, each aperture extends through both the inner and outer cage members at an angle to the radial direction, such that the inner opening of each aperture extends at a tangent to the inner wall of the inner cage member 406. As a result of the configuration of the apertures, fluid entering each aperture is caused to flow in a circular path around the inner wall of the inner cage member 406, as hereinbefore described.

The apertures 410 within a given band A to L have the same form and dimensions, in particular cross-sectional area. However, the number, arrangement and size of the apertures 410 differs between the bands A to L. The arrangement of the apertures 410 in the cage assembly 402 is summarised in the Table below.

In the Table, the figures for equivalent bore diameter for a given band refer to the nominal diameter (in) of pipe having the same cross-sectional area to fluid flow as the apertures in the band.

The width of the lands between adjacent rows of apertures is the same throughout the length of the cage and is 0.125 in.

The cage used for the Table has a nominal inside diameter of 6.0 in. The choke assembly for the cage of the Table has a fluid inlet having a nominal inside diameter of 5.125 in.

TABLE

| BAND NO. | NO. OF APERTURES | WIDTH OF APERTURES (in) | HEIGHT OF APERTURES (in) | AREA OF APERTURES (in$^2$) | TOTAL AREA FOR FLUID FLOW (in$^2$) | STROKE (in) | EQUIVALENT BORE DIAMETERS |
|---|---|---|---|---|---|---|---|
| 1  | 2 | 0.25  | 0.25 | 0.125 | 0.125  | 0.375 |        |
| 2  | 4 | 0.25  | 0.25 | 0.25  | 0.375  | 0.75  |        |
| 3  | 4 | 0.25  | 0.5  | 0.5   | 0.875  | 1.375 |        |
| 4  | 8 | 0.25  | 0.5  | 1.0   | 1.875  | 2.0   |        |
| 5  | 8 | 0.375 | 0.5  | 1.0   | 3.375  | 2.625 |        |
| 6  | 8 | 0.375 | 0.5  | 1.0   | 4.875  | 3.25  |        |
| 7  | 8 | 0.375 | 0.75 | 2.25  | 7.125  | 4.125 |        |
| 8  | 8 | 0.375 | 1.0  | 3.0   | 10.125 | 5.25  | 3.0625 |
| 9  | 8 | 0.5   | 1.0  | 4.0   | 14.125 | 6.375 | 4.0625 |
| 10 | 8 | 0.5   | 1.0  | 4.0   | 18.125 | 7.5   |        |
| 11 | 8 | 0.5   | 1.0  | 4.0   | 22.125 | 8.625 | 5.125  |
| 12 | 8 | 0.5   | 1.0  | 4.0   | 26.125 | 9.75  |        |

From the Table, it can be seen that the cage has a total of 12 rows of apertures, providing a total aperture cross-sectional area of 26.125 in$^2$. As noted above, the choke assembly has an inlet for fluid having an inner diameter of 5.125 in, that is a cross-sectional area of 20.63 in$^2$. It can thus be seen that the total area of the apertures available for fluid flow through the cage is greater than the cross-sectional area of the fluid inlet.

As shown in FIGS. 7 to 10, the bands A to L are arranged in the cage assembly 402 so as to be spaced from one another by lands 420, that is regions extending circumferentially around the cage assembly 102 that do not have apertures extending therethrough, most clearly shown in FIG. 8. In operation, the plug 120 is moved longitudinally within the cage assembly 402 to progressively cover or uncover the apertures 410 in the bands A to L. The movement of the plug is controlled such that the end surface of the plug is brought rest so as to intersect a land 420 between two adjacent bands A to L. This ensures that a given band A to L has its apertures either fully open or fully closed. In addition, the end surface 130 of the plug 120 is not exposed directly to the erosive action of the streams of fluid entering the cage through the apertures 410, as it would be if the end surface of the plug is brought to rest so as to intersect a band of apertures.

In the Table, the figures for the stroke refer to the longitudinal distance the plug of the choke assembly moves from the fully closed position, in order to completely uncover a given band and have the end surface of the plug extend across the land between the given band and the adjacent band.

Figure 11:
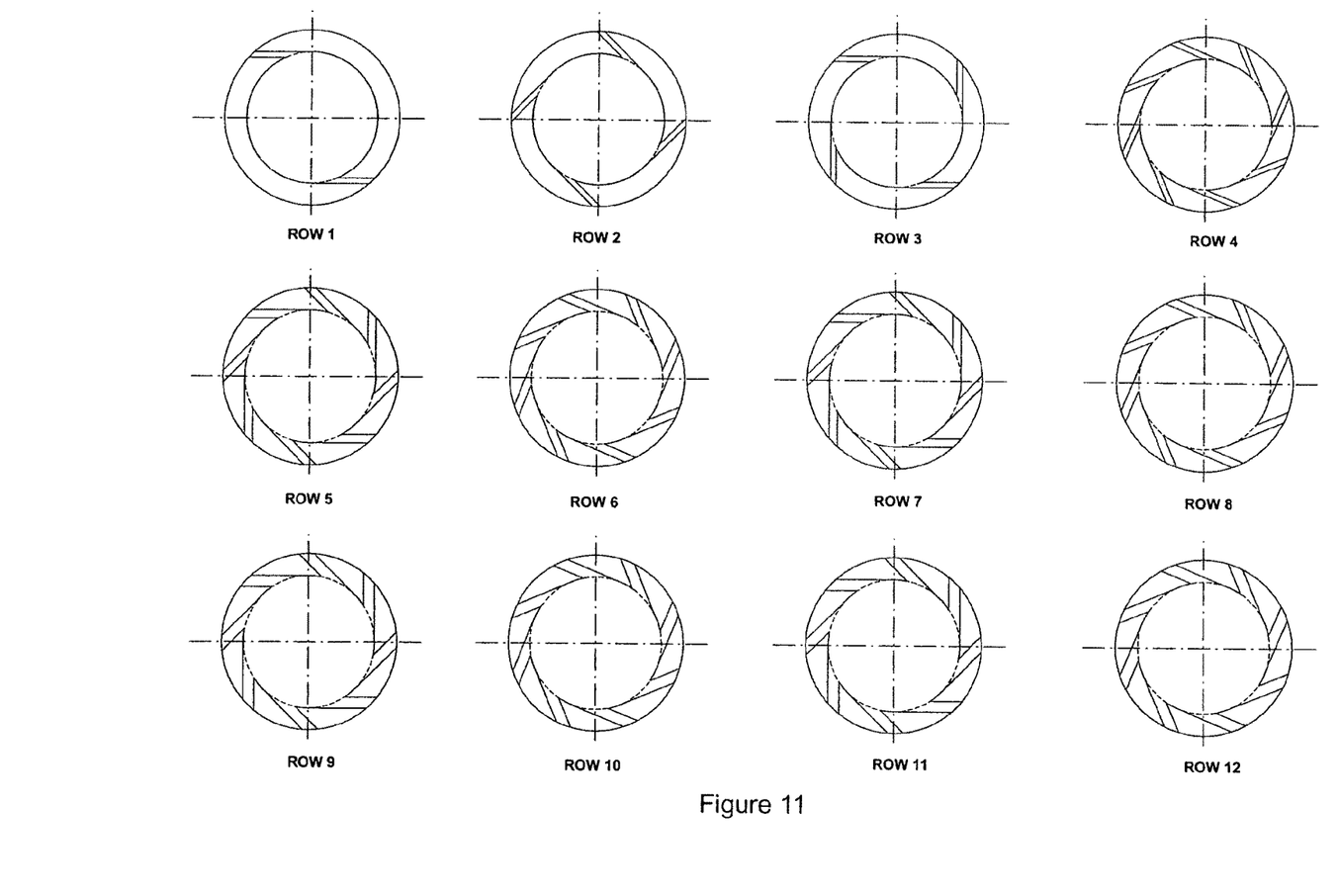
FIG. 11 is a series of cross-sectional views of the bands of apertures of the cage of FIG. 8, as used to construct the data in the Table.

FIG. 11 contains a cross-sectional representation of each of the bands of apertures 1 to 12 of the cage of FIG. 8. As can be seen in the views in FIG. 11, the apertures in a given band are offset circumferentially from the apertures in the or each adjacent band. In this way, the integrity of the cage is increased, in turn providing the cage with a higher resistance to impact from large entrained solid objects, such as may be produced from time to time from a subterranean well.

The invention claimed is:

1. A choke assembly comprising:
   a choke element comprising a fluid flow passage therethrough, the choke element comprising:
      a cage comprising an interior and a plurality of apertures therethrough for the passage of fluid; and
      a plug moveable with respect to the cage, the plug comprising an end surface that in use defines a boundary of the fluid flow passage through the choke and being moveable to open or close each of the apertures through the cage, to thereby control the flow of fluid through the cage;
   wherein the apertures in the cage are disposed in a first, second, and third portion of the cage, the first, second, and third portions are each separated by a respective land with the first portion positioned upstream of the second portion with respect to the flow of fluid through the case and the second portion positioned upstream of the third portion with respect to the flow of fluid through the case, the first portion comprising more apertures than the second portion, and the second portion comprising more apertures than the third portion;
   wherein the apertures extend through the cage at an angle to a radial direction within a plane perpendicular to a longitudinal axis of the cage such that fluid flow through the apertures into the interior of the cage results in a rotating or helical flow pattern within the cage; and
   whereby the plug is positionable with its end surface disposed to intersect the respective land, such that each aperture is fully open or fully closed to the flow of fluid.

2. The choke assembly according to claim 1, wherein the plug is disposed within the cage.

3. The choke assembly according to claim 1, wherein the apertures are arranged in rows extending circumferentially around the cage.

4. The choke assembly according to claim 1, wherein the apertures are formed with openings comprising straight sides disposed parallel to the end surface of the plug.

5. The choke assembly according to claim 1, wherein the apertures comprise sides disposed parallel to and orthogonal to the end surface of the plug.

6. The choke assembly according to claim 1, wherein each of the first, second, and third portions comprise a plurality of apertures therein.

7. The choke assembly according to claim 1, wherein the land is sufficiently wide such that the end surface of the plug is positionable a sufficient distance from the adjacent open apertures to reduce the impact of fluid flowing through the open apertures on the end surface of the plug.

8. The choke assembly according to claim 1, wherein an aperture in one portion of the cage is offset circumferentially from an aperture in the adjacent portion of the cage.

9. The choke assembly according to claim 1, wherein the apertures in the first portion comprise a different cross-sectional area to the apertures in the second portion.

10. The choke assembly according to claim 1, wherein the cross-sectional area of the apertures in each portion of the cage increases in the longitudinal direction of the cage.

11. The choke assembly according to claim 10, wherein the apertures uncovered first as the plug moves from a fully closed position comprise the least cross-sectional area and the apertures uncovered last as the plug moves to a fully open position comprise the greatest cross-sectional area.

12. The choke assembly according to claim 1, wherein the apertures extend at an angle so as to open tangentially to an inner wall of the cage.

13. The choke assembly according to claim 1, further comprising an actuator for moving the plug with respect to the cage.

14. The choke assembly according to claim 13, wherein the actuator is programmable to operate at different speeds of opening and closing the apertures in the cage.

15. A method of controlling the flow of a fluid, the method comprising:
   passing the fluid through a plurality of apertures in a cage to create a rotating or helical flow pattern within the cage, the apertures in the cage disposed in a first, second, and third portion for fluid flow at an angle to a radial direction within a plane perpendicular to a longitudinal axis of the cage, each of the first, second, and third portions of the cage being separated by a respective land with the first portion positioned upstream of the second portion with respect to the flow of fluid through the case and the second portion positioned upstream of the third portion with respect to the flow of fluid through the case, the first portion comprising more apertures than the second portion, and the second portion comprising more apertures than the third portion; and
   positioning a plug with respect to the cage to selectively close the apertures in the cage;
   wherein the plug has an end face defining a boundary of the fluid flow passage through the cage, the plug positionable with the end face of the plug extending across the respective land.

16. The method of claim 15, wherein the fluid stream is produced from a subterranean well.

17. The method of claim 16, wherein the fluid stream comprises oil, water, gas, entrained solids, or a combination thereof.

* * * * *

UNITED STATES PATENT AND TRADEMARK OFFICE
CERTIFICATE OF CORRECTION

PATENT NO. : 10,450,831 B2  
APPLICATION NO. : 12/679857  
DATED : October 22, 2019  
INVENTOR(S) : Hans Paul Hopper and Derek Meek Page 1 of 1

It is certified that error appears in the above-identified patent and that said Letters Patent is hereby corrected as shown below:

In the Claims

Column 18, Lines 29-30 (approx.) In Claim no. 1, "...WITH RESPECT TO THE FLOW OF FLUID THROUGH THE CASE...." should read "-- ...WITH RESPECT TO THE FLOW OF FLUID THROUGH THE CAGE --".

Signed and Sealed this
Twenty-first Day of April, 2020

Andrei Iancu
*Director of the United States Patent and Trademark Office*